United States Patent [19]
Koch, II

[11] 4,143,278
[45] Mar. 6, 1979

[54] RADIATION CURE REACTOR

[75] Inventor: Robert L. Koch, II, Evansville, Ind.

[73] Assignee: Geo. Koch Sons, Inc., Evansville, Ind.

[21] Appl. No.: 796,855

[22] Filed: May 16, 1977

[51] Int. Cl.² .............. B01K 1/00; F26B 3/34
[52] U.S. Cl. .......................... 250/527; 34/1; 34/4; 34/39; 34/41
[58] Field of Search .......... 250/527, 504, 514; 34/1, 4, 39, 41

[56] References Cited

U.S. PATENT DOCUMENTS

| | | | |
|---|---|---|---|
| 3,826,014 | 7/1974 | Helding | 34/4 |
| 3,991,484 | 11/1976 | Lamb et al. | 34/4 |
| 4,025,795 | 5/1977 | Lackore et al. | 34/4 |
| 4,037,329 | 7/1977 | Wallace | 34/4 |

Primary Examiner—Benjamin R. Padgett
Assistant Examiner—Deborah L. Kyle
Attorney, Agent, or Firm—Jenkins, Coffey & Hyland

[57] ABSTRACT

A radiation reactor for curing radiation curable products, coatings, inks, etc. The reactor has a plurality of radiation producing lamps carried in an enclosed chamber for directing radiation onto a coated substrate conveyed through the chamber. Supply and exhaust fans circulate ambient air through the chamber for cooling the chamber interior. A coolant carrying pipe is interposed between the lamps and the substrate conveyed to block at least a portion of the radiation field produced by the lamps for cooling the substrate surface.

25 Claims, 6 Drawing Figures

RADIATION CURE REACTOR

BACKGROUND OF THE INVENTION

This invention relates to radiation cure reactors. More specifically, this invention relates to a radiation cure reactor having apparatus for cooling the reactor and a radiation curable product, coating, ink, or the like subjected to radiation within the reactor. The invention is applicable to a wide variety of radiation curable products, items and materials.

A wide variety of coatings and the like are applied to the surfaces of various substrates. For example, various plastic or vinyl films, resinous-based finishes, and the like are applied to substrates such as particle board, etc. Moreover, various inks are used for printing on papers of many different types and test strengths. In industrial processes, it is highly desirable to cure these coatings and inks as quickly as possible so that subsequent product processing steps may occur. It is equally important that the coating or ink be cured in an efficient, inexpensive manner which does not detrimentally affect the desired quality of the finished product.

In the prior art, it has been common practice to use conventional hot air or infrared ovens for curing industrial coatings and inks. With such ovens, the coated substrate is conveyed through the oven where it is subjected to elevated temperatures for drying and curing of the coating or ink. It is well known, however, that hot air or infrared ovens are unsatisfactory for curing many types of industrial products since the heat generated by the ovens can cause the products or surface coating to warp, distort, or shrink. This is particularly true with plastic or vinyl based surface films, and with many types of paper when printed. Distortion of the product or of the surface coating on the product makes the finished item unacceptable for sale or use. Moreover, it has been found that hot air or infrared ovens require prolonged curing times, and tend to use excessive quantities of energy.

Radiation cure reactors have been proposed in an effort to overcome the disadvantages of hot air ovens. Radiation cure reactors include a source of radiation such as an ultraviolet radiation producting lamp carried in a relatively closed chamber which confines and directs radiation onto the surface of a substrate. Theoretically, radiation cure equipment quickly and completely cures radiation curable coatings and products without requiring the presence of heat. However, modern commercially available radiation lamps operate at high temperatures, in the area of about 1100° F., and thereby produce large quantities of heat during operation. Accordingly, modern radiation cure reactors experience a significant heat build-up within the closed lamp chamber which tends to adversely affect the coating or the product being cured. Moreover, modern ultraviolet radiation lamps tend to produce undesirably large quantities of infrared radiation during operation to expose the surface of the substrate being cured to an instantaneous temperature substantially higher than the air temperature within the reactor as the substrate passes in close proximity with a radiation producing lamp. The result is that radiation cure reactors sometimes expose the substrate to higher temperatures than those encountered with the more conventional hot air ovens.

Some attempts have been made in the prior art to reduce the heating effects of modern radiation cure equipment. One such attempt comprises supplying fan-forced ambient air through a duct network and directly onto the surface of the irradiated substrate. Another system comprises high volume, fan-forced circulation of ambient air freely throughout the relatively closed lamp chamber. In both systems, the steady state temperature of air within the chamber is reduced, but neither system avoids the substantially instantaneous exposure of the substrate to extremely high temperature resulting from infrated components of radiation as the substrate passes in close proximity with the radiation producing lamp.

Other attempts have been made in the prior art to control the surface temperature of a substrate during curing by means of coolant-carrying tubing within the enclosed lamp chamber. See, for example, copending U.S. Patent Application Ser. No. 742,580, owned by the assignee of this invention. The tubing is positioned in close proximity with the substrate and the radiation producing lamps so as to absorb heat without blocking the field of radiation. Again, this system results in a lower steady state air temperature within the enclosed lamp chamber, but it does not protect against instantaneous excessive temperatures resulting from direct radiation from the lamps.

The radiation cure reactor of this invention overcomes the problems and the disadvantages of the prior art by providing an improved cooling system for controlling excessive substrate surface temperatures during curing.

SUMMARY OF THE INVENTION

In accordance with the invention, a radiation cure reactor comprises a substantially closed housing with a plurality of radiation producing lamps mounted in an upper chamber. A conveyor passes through the housing between the upper chamber and a lower chamber. The conveyor carries substrates coated or printed with a radiation curable substance into close proximity with the radiation producing lamps for irradiating and curing the curable substance. A supply fan is provided to draw ambient air through an inlet duct and into the housing, over the lamps, and onto the surface of the substrate. The air passes over the conveyor, and exits the housing through an exhaust duct in which an exhaust fan may be provided for promoting high volume air circulation. Generally, the fan is used to remove the air from below the conveyor belt when processing light weight sheets of plastic and paper and from above the conveyor when processing heavier substrates.

Conduit means such as a pipe is mounted in the housing between the radiation producing lamps and the conveyor. The pipe provides a flow path for carrying a supply of liquid coolant into close proximity with the surface of the substrate for absorbing generated heat and for cooling the irradiated surface of the substrate. The pipe passes transversely over the conveyor and substrates, and beneath each of the radiation producing lamps to block at least a portion of the field of radiation generated by each lamp. Thus, the coolant-carrying pipe absorbs heat from the air within the housing, and protects the surface of the substrate against excessive temperature resulting from direct infrared radiation.

In one embodiment of the invention, the pipe is mounted on longitudinally extending track means within the housing. A control arm is connected to the pipe and is operable from the outside of the housing for controllably sliding the pipe longitudinally along the track means beneath the lamps. With this construction, the pipe is controllably shifted with respect to the lamps for adjusting the degree of blockage of the radiation field.

BRIEF DESCRIPTION OF THE DRAWINGS

The accompanying drawings illustrate the invention. In such drawings.

DETAILED DESCRIPTION OF THE PREFERRED EMBODIMENT

Figures 1, 2:
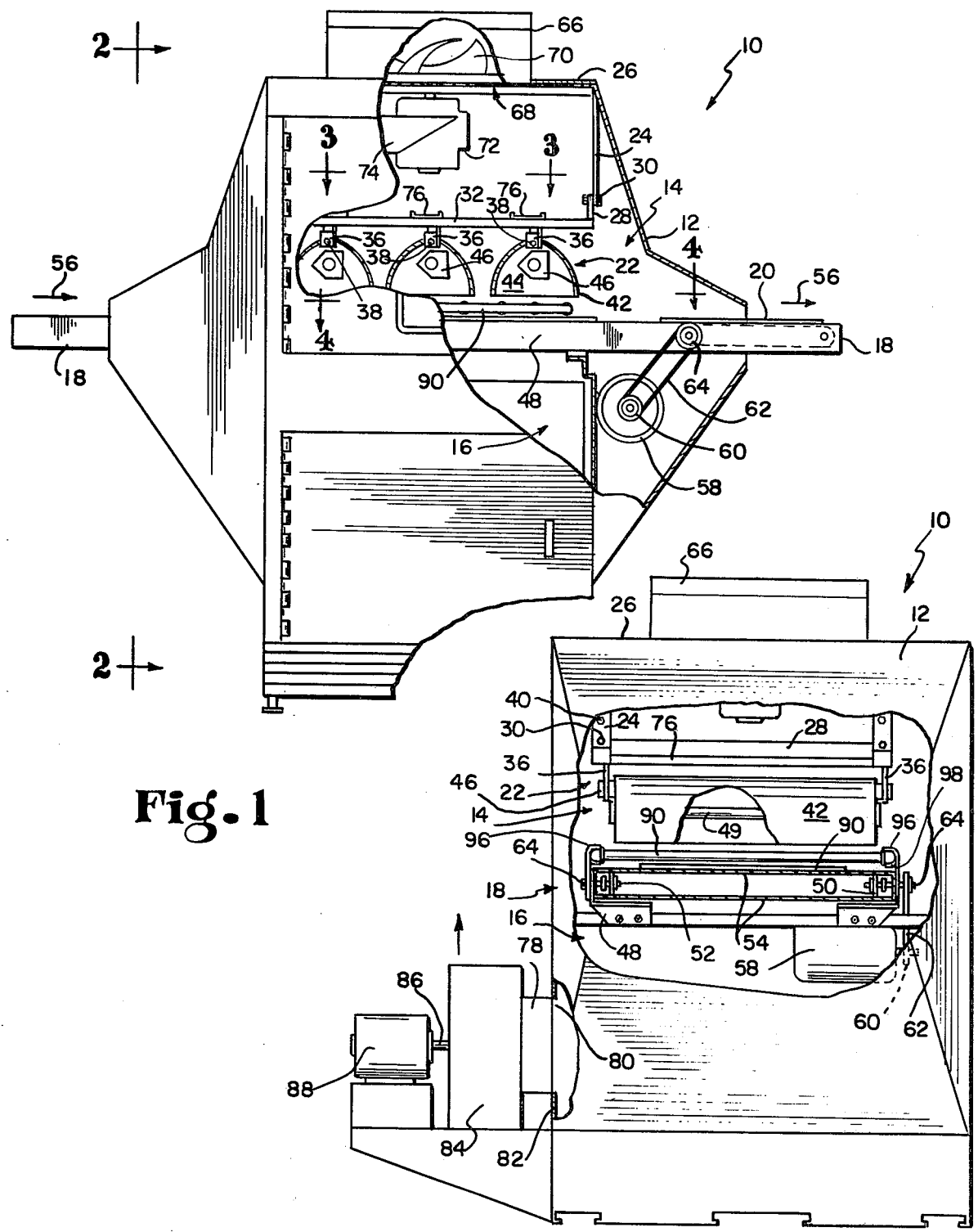
FIG. 1 is a front elevation view of a radiation cure reactor of this invention, with portions broken away.
FIG. 2 is an end elevation view of the reactor taken on the line 2—2 of FIG. 1, with portions broken away.

A radiation cure reactor 10 of this invention is shown in FIGS. 1-4, and generally comprises a substantially enclosed housing 12 having an upper chamber 14 and a lower chamber 16. A conveyor 18 is carried on the housing 12, and extends through the housing between the upper and lower chambers 14 and 16. The conveyor carries work to be cured, or substrates 20, such as sheets of wood, particle board, paper, or the like through the housing 12. Importantly, the substrates 20 are coated with a radiation curable substance such as a curable resin, plastic or vinyl film, printing ink, etc. The curable substance is cured within the reactor 10 by radiation produced by a plurality of radiation lamp assemblies 22 mounted above the conveyor 18 within the upper chamber 14 of the housing.

Figure 3:
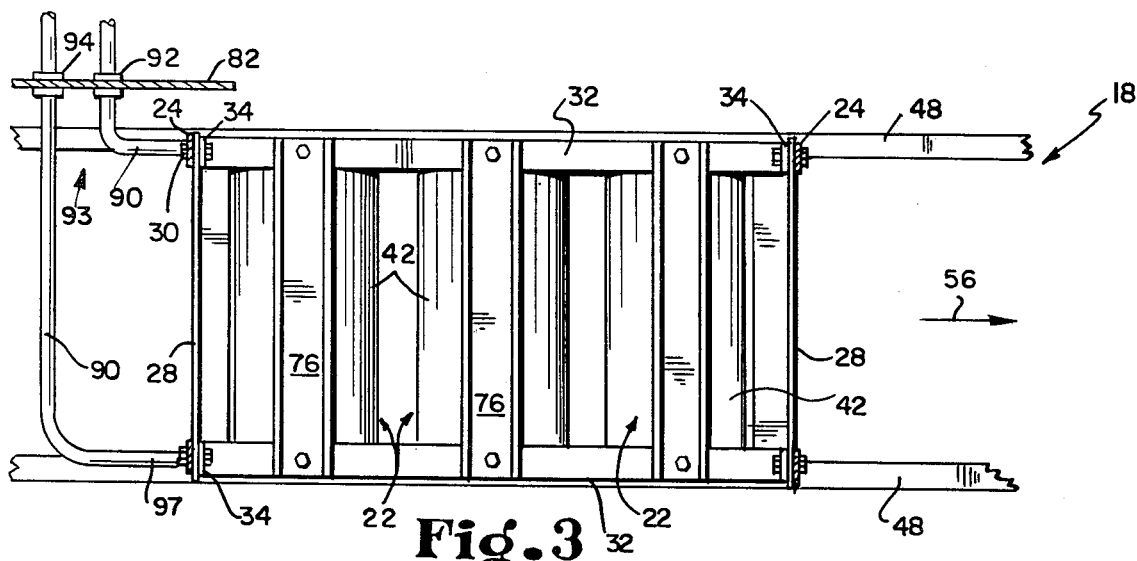
FIG. 3 is a horizontal section taken on the line 3—3 of FIG. 1.

The lamp assemblies 22 are suspended within the housing 12 above the conveyor 18, as shown in FIGS. 1-3. As shown, four hanger brackets 24 are connected to and extend downwardly from the four corners of a generally rectangularly shaped top wall 26 of the housing 12. A pair of support beams 28 extend transversely with respect to the conveyor 18, with each support beam 28 being connected between two of the hanger brackets 24 by bolts 30. More specifically, one support beam is connected between the two hanger brackets 24 near one end of the conveyor 18, and the other support beam is connected between the remaining two hanger brackets 24 near the other end of the conveyor.

The hanger brackets 24 are also connected to a pair of longitudinally extending hanger beams 32. The hanger beams 32 have upwardly turned ends 34 connected to the hanger brackets 24 by the bolts 30. The hanger beams 32 extend in parallel above the conveyor 18 and generally on opposite sides of the conveyor, with each hanger beam 32 being connected between the adjacent two hanger brackets 24 on its associated side of the conveyor. Each hanger beam 32 includes a plurality of longitudinally spaced, downwardly turned connecting tabs 36 for connection to one end of one of the lamp assemblies 22. More specifically, the connecting tabs 36 of the two hanger beams 32 are transversely aligned with each other, and each aligned pair of tabs is connected by bolts 38 to the opposite ends of a lamp assembly 22. In this manner, the hanger beams 32 and the support beams 28 provide a rigid structure for carrying a plurality of longitudinally spaced lamp assemblies each extending transversely in parallel over the underlying conveyor 18. Importantly, the bolts 30 are received through one of a plurality of vertically spaced holes 40 in the hanger brackets 24 to allow vertical adjustment of the lamp assemblies 22 with respect to the conveyor 18.

Each of the lamp assemblies 22 comprises a downwardly open, transversely extending reflector 42 having a generally semi-elliptical cross section as shown in FIG. 1. The reflector 42 is closed at its opposite ends by vertically extending end walls 44 which are connected to the hanger beam tabs 36 by the bolts 38. The reflector end walls 44 of each lamp assembly also carry sockets 46 for receiving the opposite ends of an elongated source of radiation, such as an ultraviolet radiation producing lamp 49. Electrical power for the lamps is provided in a well-known manner, and thus is not shown in the drawings for purposes of clarity.

The conveyor 18 comprises a pair of parallel rails 48 extending longitudinally through the housing 12 between the upper and lower chambers 14 and 16. The rails 48 each carry rollers 50 mounted on spindles 52, and said rollers 50 in turn support a conveyor belt 54. The belt 54 is driven in the direction of arrows 56 by a motor 58 mounted within the housing 12 and connected to at least one of the rollers 50 by a driving pulley 60, a driving belt 62, and a driven pulley 64. Accordingly, the conveyor 18 operates to convey a succession of substrates 20 through the housing 12 beneath the lamp assembly 22 for irradiating the upwardly presented surfaces of the substrates.

The housing 12 includes an air inlet duct 66 mounted on the top wall 26 of the upper chamber 14 of the reactor housing. The inlet duct 66 is aligned with an air inlet opening 68 formed in the top wall 26 for the passage of cooling ambient air downwardly into the housing upper chamber 14. A supply fan 70 is mounted generally within the inlet opening 68, and is rotatably driven by a suitably powered motor 72 carried by mounting brackets 74 connected to the housing 12. In operation, the supply fan 70 serves to deliver a relatively large volume of ambient air through the inlet duct 66 and into the housing upper chamber 14. The air flows over the lamp assemblies 22, the substrates 20, the conveyor 18, and into the lower chamber 16 of the housing. Importantly, baffles 76 comprising elongated sections of perforated metal or the like are supported upon the hanger beams 32 generally above each lamp reflector 42 to protect the reflectors 42 against damage from direct impact with high velocity ambient air.

The ambient air is exhausted from the lower chamber 16 of the housing 12 through an exhaust duct 78. As shown in FIG. 2, the exhaust duct 78 is aligned with an exhaust passage 80 formed in the rear wall 82 of the housing lower chamber. The duct extends rearwardly from the housing in communication with an upwardly open exhaust fan 84 to discharge a high volume of air from the housing. The fan 84 is mounted on a shaft 86 which in turn is rotatably driven by a suitably powered motor 88.

The ambient air circulated through the housing 12 serves to absorb heat generated within the housing by the lamp assemblies 22. More specifically, the ambient air flows substantially freely and directly into the housing upper chamber 14 and over the lamp assemblies 22 and the irradiated surfaces of the substrates 20. Thus, the circulating air continuously absorbs heat generated by the lamp assemblies 22 and also absorbs some of the heat at the irradiated substrate surfaces resulting from infrared components of radiation.

Figure 4:
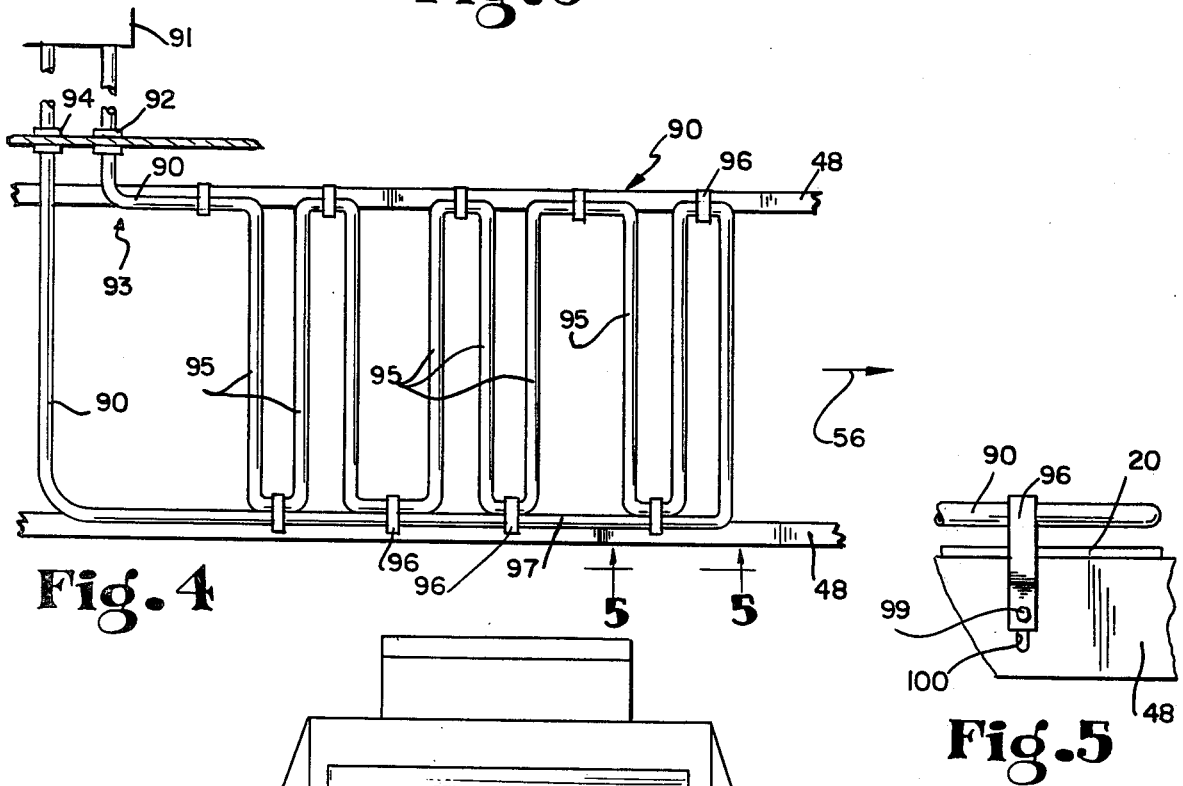
FIG. 4 is a horizontal section taken on the line 4—4 of FIG. 1.
Figure 5:
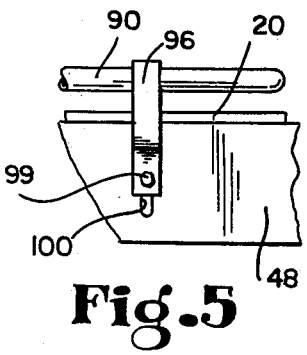
FIG. 5 is an enlarged fragmented vertical section taken on the line 5—5 of FIG. 4.

A cooling pipe 90 is interposed between the downwardly open lamp assemblies 22 and the conveyed substrates 20 to provide additional cooling for the reactor. The pipe 90 may be formed from a continuous length of black iron pipe, aluminum pipe, or the like, and as shown in FIG. 4, extends from a suitable supply 91 of liquid coolant such as a reservoir of water including a pump into the upper chamber 14 of the housing through a fitting 92 on the housing rear wall 82. The pipe 90 extends into the upper chamber near one end of the conveyor 18 and at a position spaced slightly above the conveyor. The pipe turns longitudinally along one side of the conveyor above one of the conveyor rails 48, as at 93, and then makes a series of transverse parallel passes 95 back and forth over the conveyor. The transverse passes 95 of the pipe 90 are longitudinally spaced from each other and extend perpendicularly with respect to the direction of substrate travel on the conveyor, with a plurality of said passes being provided beneath each one of the downwardly open lamp assemblies 22. After the last transverse pass 95, the pipe 90 has a return leg 97 extending back along one side of the conveyor 18, and then crossing transversely above the conveyor for connection to the coolant supply 91 by way of a fitting 94 formed in the housing rear wall 82. Importantly, a series of support stakes 96 are mounted by bolts 99 on the support rails 48 of the conveyor 18, and extend upwardly to provide facing jaws 98 for receiving and supporting the pipe 90 in a position spaced closely above and parallel with the conveyor. Conveniently, as shown in FIG. 5, the bolts 99 are received through vertically extending slots 100 in the conveyor rails 48 to allow adjustment of the vertical spacing between the pipe 90 and the underlying conveyed substrates 20.

The pipe 90 provides a flow path or conduit for liquid coolant pumped from the coolant supply 91. The pipe 90 carries the liquid coolant into close proximity with the irradiated surfaces of the substrates 20 and with the radiation producing lamps 49. The transverse passes 95 of the pipe 90 are positioned to block at least a portion of the projected field of radiation produced by the lamps 49 and directed downwardly by the reflectors 42, and thereby intermittently shadow the substrates from radiation as they are conveyed through the housing. The heat absorbing surface of the pipe 90 may serve to absorb heat from the air and infrared radiation in the vicinity of the irradiated surfaces of the substrates, and the coolant serves to carry the heat away from the housing. It has been found that aluminum pipe will reflect the ultraviolet radiation while absorbing heat and cooling the surface of the product. In this manner, the substrates are exposed to ultraviolet radiation for curing of the curable substance thereon without subjecting the substrates to any excessive temperature levels. Accordingly, the curable substance on the substrates is cured without any detrimental effects to the substance or the substrate.

The design specifications of the supply and exhaust fans 70 and 84, and of the cooling pipe 90, are variable according to the specific radiation cure reactor being used as well as the type of radiation curable substance being cured. However, by way of example, it has been determined empirically that most substrates and most radiation curable substances are not detrimentally affected by temperatures of about 120° F. or less. Accordingly, for most radiation cure reactors, it is necessary to balance the cooling effects of the cooling ambient air and of the coolant-carrying pipe 90 so that the irradiated surfaces of the substrates are not exposed to temperature levels substantially greater than 120° F.

In one working embodiment of the invention, a radiation cure reactor was provided with three ultraviolet radiation producing lamps 49 each about twenty-five inches in length and carried in a semi-elliptical reflector 42 having a focus length of about 3.75 inches. The lamps were powered with a total input power of about 15,000 watts, and operated at a temperature of about 1100° F. The air inlet and exhaust ducts 66 and 78, and the supply and exhaust fans 70 and 84, were designed to circulate through the housing about 1000 cubic feet per minute (cfm) of ambient air at room temperature (about 70° F.). With this construction, it was found that the circulating air removed from the housing about 39,000 British thermal units (BTU's) of heat energy each hour, and that the air temperature within the housing upper chamber 14 reached a substantially uniform steady state level of about 106° F. However, with the conveyor 18 operating at a commercially desirable speed of about 60 feet per minute (fpm), it was determined empirically that the irradiated surfaces of the substrates 20 were exposed to temperature levels greater than 120° F. resulting from exposure to infrared components of radiation produced by the lamps 49.

The cooling pipe 90 was installed between the lamps 49 and the conveyor 18. The pipe was formed from 0.75 inch black iron pipe through which water was circulated at about 1.2 gallons per minute. The pipe was formed to make three transverse passes 95 on approximately three inch centers beneath each of the reflectors 42, with the central transverse pass 95 being positioned in vertical alignment with the associated lamp 49. The pipe passes 95 were positioned about 0.25 to about 0.50 inch above the conveyed substrates 20, and about 1.0 to about 4.0 inches below the reflectors 42 of the lamp assemblies 22. With the three lamps 49 operating at full power and with the conveyor 18 operating at about 60 fpm, it was determined empirically that the circulating water removed about 11,800 BTU's of heat energy each hour, and that the temperature of the irradiated substrate surfaces did not exceed 100° F. Accordingly, the combination cooling provided by the circulating ambient air and the coolant-carrying pipe 90 served to prevent exposure of the substrates and the radiation curable substance thereon to excessive temperature levels.

Figure 6:
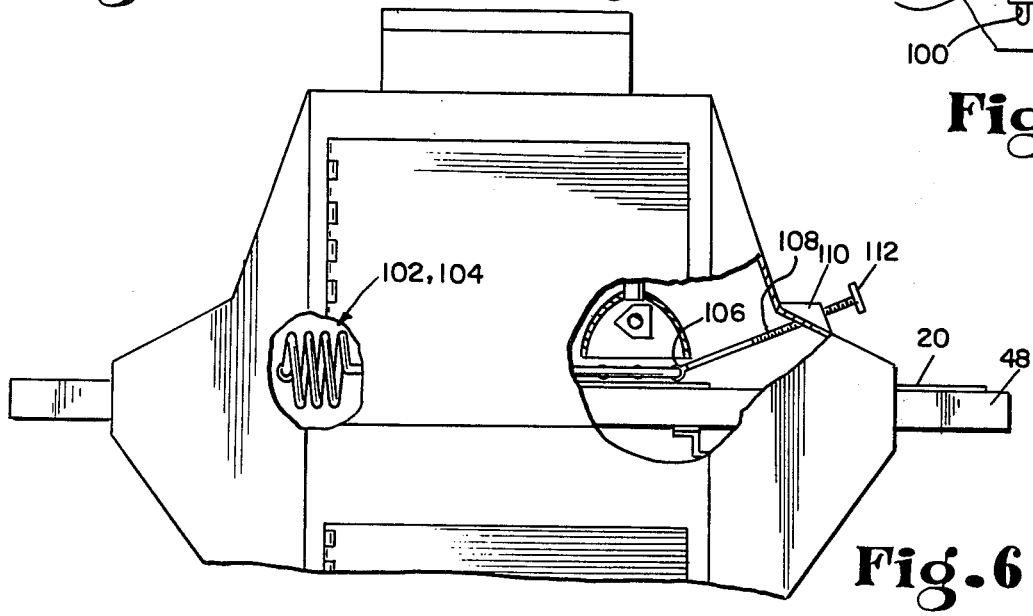
FIG. 6 is an enlarged fragmented front elevation view of an alternate embodiment of the reactor, with portions broken away.

With some radiation curable substances, it was noted that the cooling pipe 90 blocked the field of radiation from the substrates 20 to such an extent that adequate radiation curing was prevented. In this regard, the reactor 10 was modified to allow adjustment of the degree of blockage of the radiation field, as shown in FIG. 6. In this modification, the pipe 90 is received through the fitting 92 in the rear wall 82 of the housing. The pipe 90 is interrupted by a longitudinally extending flexible coil 102 prior to the series of transversely extending pipe passes 95 beneath the lamp assemblies. Similarly, the return leg 97 of the pipe 90 is interrupted by another longitudinally extending flexible coil 104 prior to connection to the fitting 94 in the housing rear wall. Importantly, the jaws 98 of the support stakes 96 are adapted to receive and support the pipe 90 in a manner to allow longitudinal sliding movement of the pipe. In this manner, the stakes 96 provide a track to allow the transverse passes 95 of the pipe to be adjusted with respect to the lamps 49 within the lamp assemblies 22. A sleeve 106 is carried over the transverse pipe pass opposite the inlet and outlet fittings 92 and 94. The sleeve is connected to one end of a threaded rod 108 which in turn has its other end threadably received in a threaded boss 110 on the housing. The rod is rotatable by means of a knob 112 for sliding the entire pipe 90 along the stakes 96 and with respect to the lamp assemblies 22.

In a working embodiment of the invention, the transverse passes 95 of the pipe 90 were shifted with respect to the lamp assemblies 22 such that the central pipe pass 95 beneath each lamp assembly was positioned approximately 1.5 inches off center from a vertical plane extending through the associated lamp 49. In this position, with the conveyor operating at about 60 fpm, it was determined empirically that the peak temperature to which the irradiated surfaces of the substrates were exposed was about 120° F. At this temperature, sufficient radiation reached the substrates to completely and uniformly cure the radiation curable substance thereon. However, the substrates were still protected from harmful excessive temperature levels.

In the radiation cure reactor of this invention, a wide variety of adjustments and modifications are available without varying from the scope of the invention. For example, various means are available for positioning the cooling pipe 90 between the lamp assemblies 22 and the conveyor 18, and for allowing longitudinal and vertical adjustment of the pipe and lamp assemblies with respect to each other. Moreover, the invention is readily adaptable for use with different reactors having different numbers or types of radiation producing lamps. Still further, the cooling pipe 90 can be formed from a wide variety of materials, such as a tubing material for absorbing infrared radiation and for allowing passage of ultraviolet radiation or materials such as aluminum which will reflect radiation while absorbing heat.

The reactor of this invention is usable with a wide variety of radiation curable products. For instance, the reactor has been used successfully to cure UV curable resins in molds. In such resin curing, the process is slower and the need for curing is even more important.

I claim:

1. In a radiation reactor, a radiation source comprising a radiation producing device for establishing a projection field of radiation; conveyor means for positioning work to be cured within said field; conduit means interposed in said field between and in spaced relation to said radiation source and said conveyor means to block at least a portion of said field; said conduit means carrying a cooling fluid for absorbing heat generated by said radiation source; and means for adjusting the spacing between said conduit means and said conveyor means.

2. The invention as set forth in claim 1 wherein said device comprises an ultraviolet radiation producing lamp.

3. The invention as set forth in claim 1 including a reflector disposed adjacent said device for directing radiation in a first direction for establishing said radiation field.

4. The invention as set forth in claim 1 wherein said conduit means comprises a pipe for carrying said cooling fluid, and means for circulating said cooling fluid through said pipe.

5. The invention as set forth in claim 1 wherein said conduit means has a black heat absorbing surface.

6. The invention as set forth in claim 1 wherein said conduit means comprises a metal pipe.

7. The invention as set forth in claim 1 including means for circulating air adjacent said device.

8. The invention as set forth in claim 1 including means for adjustably positioning said conduit means within said field to vary the degree of blockage of said field.

9. In a radiation cure reactor, a radiation source comprising a lamp assembly for projecting a field of radiation generally in a first direction; conveyor means for positioning work to be cured within said field; conduit means disposed in said field in spaced relation to said conveyor means; said conduit means being for conducting a cooling fluid through said field for absorbing heat generated by said radiation source; and means for adjusting the spacing between said conduit means and said conveyor means.

10. The invention as set forth in claim 9 including means for circulating air adjacent said lamp assembly.

11. The invention as set forth in claim 9 including means for adjustably positioning one of said conduit means and said lamp assembly with respect to each other to vary the degree of blockage of said field.

12. The invention as set forth in claim 9 including means for adjustably positioning said conduit means to vary the degree of blockage of said field.

13. In a radiation cure reactor having at least one lamp assembly for producing a radiation field of projection and means for positioning work to be cured within said field, wherein the improvement comprises conduit means interposed between and in spaced relation to the lamp assembly and the positioning means to block partially the work from the field, said conduit means conducting a cooling fluid through said field, and means for adjusting the spacing between said conduit means and said positioning means.

14. The invention as set forth in claim 13 including means for circulating the cooling fluid through said conduit means.

15. The invention as set forth in claim 13 wherein said positioning means comprises a conveyor for carrying the work through said field.

16. The invention as set forth in claim 13 including means for circulating air adjacent the lamp assembly and the positioning means.

17. The invention as set forth in claim 13 including means for adjustably positioning said conduit means within said field to vary the degree of blockage of said field.

18. A radiation cure reactor comprising a housing; a lamp assembly mounted within said housing for producing a radiation field of projection; means for positioning work to be cured within said field; conduit means disposed within said field in spaced relationship to said lamp assembly and said positioning means to block partially said field; means for circulating a cooling fluid through said conduit means; means for circulating air through said housing for absorbing heat from said lamp assembly and from the work to be cured; and means for adjusting the spacing between said conduit means and said positioning.

19. The invention as set forth in claim 18 including means for relatively adjusting said conduit means and said lamp assembly to vary the degree of blockage of said field.

20. The invention as set forth in claim 18 including a plurality of lamp assemblies mounted within said housing, said conduit means comprising a continuous pipe formed to provide a plurality of passes through the radiation field of each of said lamp assemblies to block partially the radiation field of each lamp assembly.

21. The invention as set forth in claim 20 including track means for movably supporting said pipe with respect to said lamp assemblies, and adjustment means for controllable shifting said pipe along said track means.

22. The invention as set forth in claim 18 including an air supply duct; a supply fan for circulating air through said supply duct and into said housing; an exhaust duct; and an exhaust fan for exhausting air from said housing through said exhaust duct.

23. In a radiation cure reactor having at least one lamp assembly for producng a radiation field of projection and means for positioning work to be cured within said field, wherein the improvement comprises means interposed between and in spaced relationship to the lamp assembly and the positioning means for blocking a portion of the radiation field from and absorbing heat in proximity to the work to be cured, means for adjustably positioning said blocking means within said field to vary the degree of blockage of said field, and means for adjusting the spacing between said blocking means and said positioning means.

24. The invention as set forth in claim 23 wherein the positioning means comprises a conveyor for carrying the work through said field, and said blocking means comprises a continuous pipe formed to provide a plurality of parallel passes through said field.

25. The invention of claim 1 wherein said conduit means has a reflective surface.

* * * * *

UNITED STATES PATENT OFFICE
CERTIFICATE OF CORRECTION

Patent No. 4,143,278   Dated  March 6, 1979

Inventor(s)  Robert L. Koch, II

It is certified that error appears in the above-identified patent and that said Letters Patent are hereby corrected as shown below:

Column 6, line 19, change "39,000" to --29,000--.

Column 8, line 62, (claim 18), after "positioning" insert --means--.

Column 9, line 16, (claim 23), change "producng" to --producing--.

Signed and Sealed this

Seventeenth Day of July 1979

[SEAL]

Attest:

LUTRELLE F. PARKER

*Attesting Officer*   *Acting Commissioner of Patents and Trademarks*